Dec. 12, 1933.  J. M. CHRISTMAN  1,938,568
SHOCK ABSORBER
Filed April 22, 1932   2 Sheets-Sheet 1
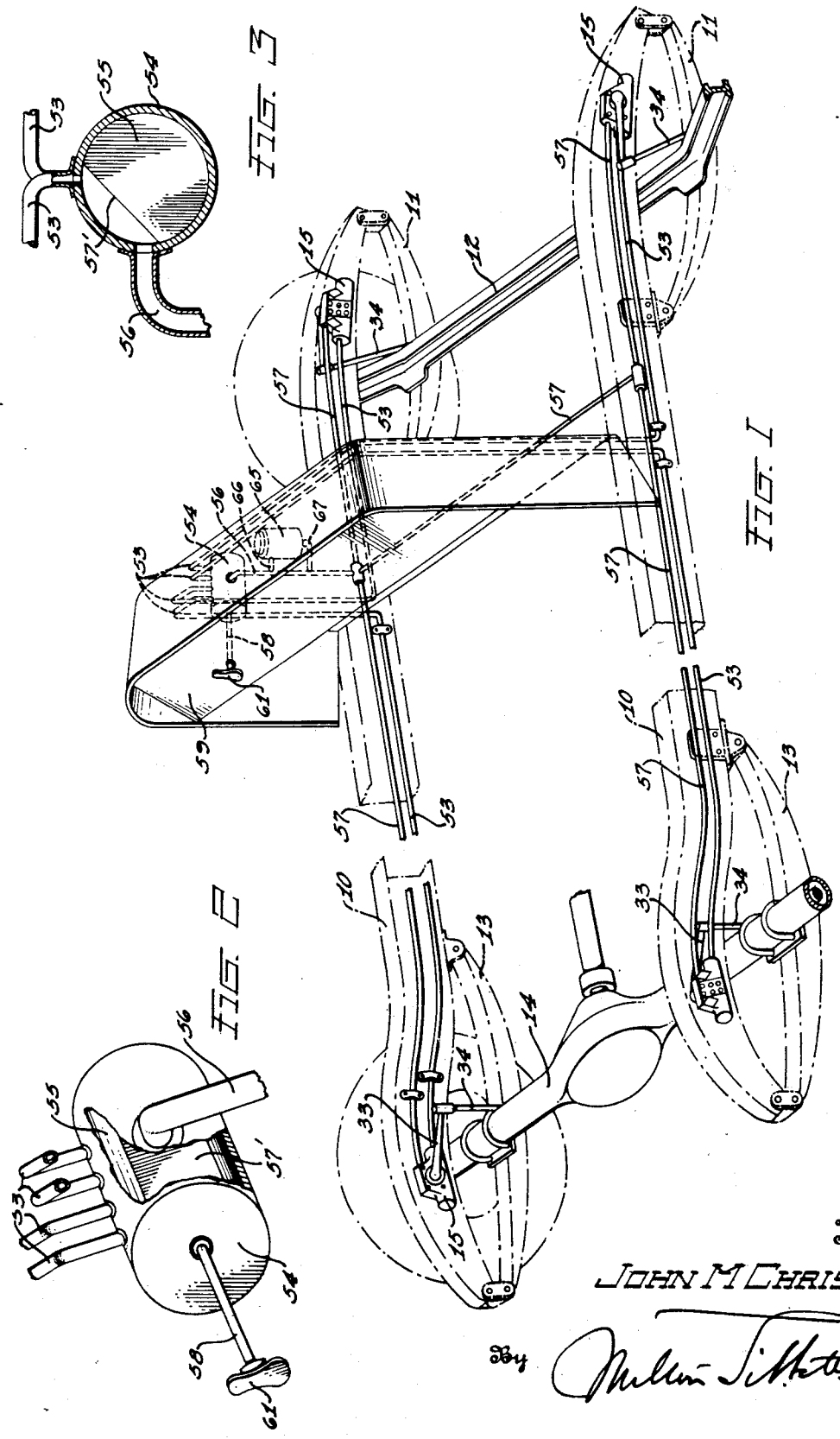
Inventor
JOHN M CHRISTMAN.
By William Tibbetts
Attorney Dec. 12, 1933.    J. M. CHRISTMAN    1,938,568
SHOCK ABSORBER
Filed April 22, 1932    2 Sheets-Sheet 2

Inventor
JOHN M. CHRISTMAN.
By
Attorney

Patented Dec. 12, 1933

1,938,568

UNITED STATES PATENT OFFICE 1,938,568

SHOCK ABSORBER

John M. Christman, Detroit, Mich., assignor to Packard Motor Car Company, Detroit, Mich., a corporation of Michigan Application April 22, 1932. Serial No. 606,925

9 Claims. (Cl. 188—87)

This invention relates to shock absorbers for motor vehicles and to the adjustment thereof.

In the operation of motor vehicles and particularly pleasure cars, it is often found necessary to change the adjustment of the shock absorbers in accordance with the temperature, weather conditions, road surface, vehicle load, and the like. It is also particularly desirable to change the shock absorber adjustment in accordance with the vehicle speed so that the full benefits of the suspension springs may be realized when the vehicle is traveling at slow speeds or the shock absorber resistance to the spring movements may be intensified during high speed driving. It is of considerable advantage to be able to make these adjustments as simply and easily as possible from some central position as, for instance, the driver's seat while the car is in operation.

The present invention contemplates and has for one of its objects the provision of a motor vehicle shock absorber which may be quickly and easily adjusted by the vehicle driver to compensate for changes in driving speed, temperature, road surface, vehicle load and the like.

It is another object of the invention to provide an improved shock absorber for motor vehicles.

Another object of the invention is to provide adjustment means for motor vehicle shock absorbers which is readily operable from within the body.

A further object of the invention resides in the provision of means for adjusting the resistance of a plurality of shock absorbers simultaneously from a central position within easy reach of the vehicle operator.

Other objects and advantages of the present invention will become apparent from a reading of the following description taken in connection with the accompanying drawings, in which:

Fig. 1 is a schematic perspective view of a vehicle chassis showing one form of the invention applied thereto;

Fig. 2 is a perspective view partially in section of the manually adjustable valve for controlling the shock absorber resistance;

Fig. 3 is a cross-sectional view of the valve mechanism shown in Fig. 2;

Figure 5:
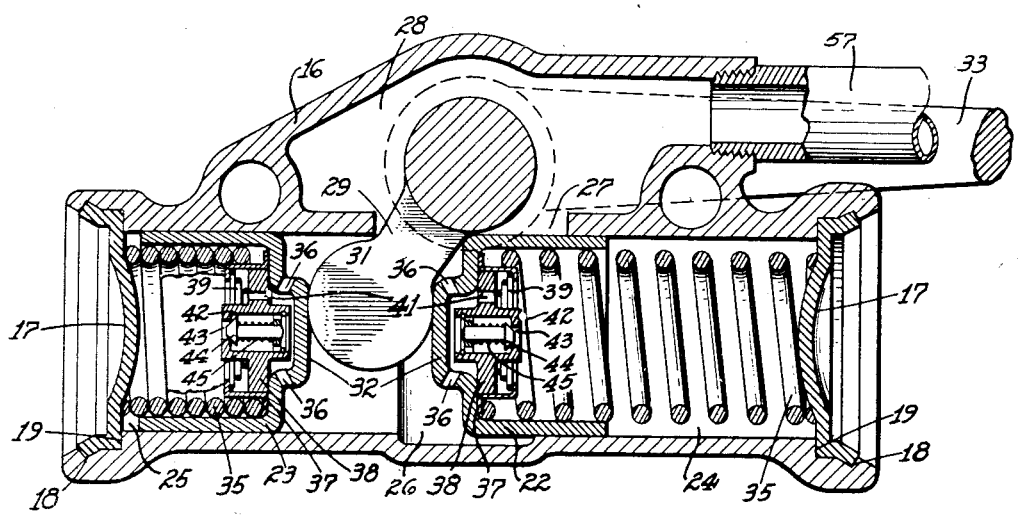
Fig. 5 is a longitudinal sectional view of one of the shock absorbers taken substantially on the line 5—5 of Fig. 4.

Referring to the drawings, Fig. 1 shows, more or less diagrammatically, a vehicle chassis having a frame provided with side members 10, each connected in a conventional manner by springs 11 to the front axle 12 and by springs 13 to a rear axle 14.

To control the action of the springs, there is provided near each end of each axle and connected at a suitable place on the frame, a shock absorber 15. Each shock absorber, for purposes of illustration, is shown as secured to the inner faces of the frame members 10 and arranged one for each spring.

Figure 6:
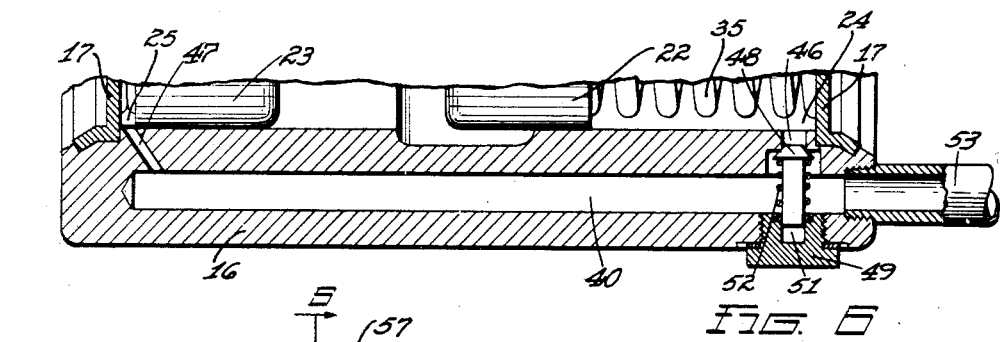
Fig. 6 is a sectional view taken on the line 6—6 of Fig. 4 showing the fluid by-pass arrangement.
Figure 4:
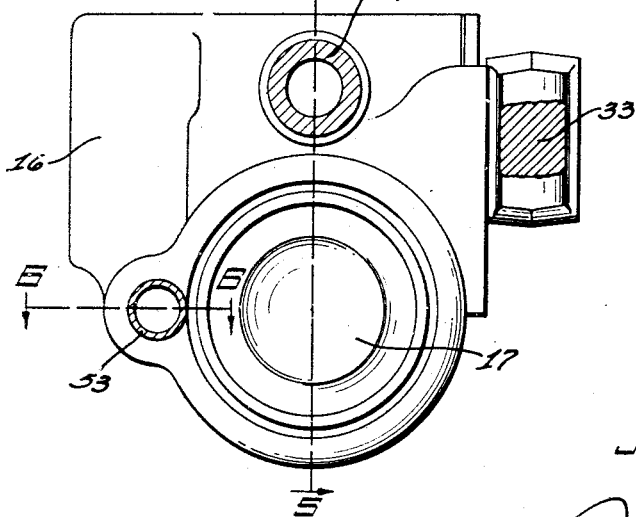
Fig. 4 is an end elevational view of one of the shock absorbers shown in Fig. 1.

Having reference to Figs. 4, 5, and 6, it will be seen that each shock absorber comprises a casing 16 formed with an interior cylindrical chamber extending the full length thereof. The casing member at its ends and adjacent the ends of the cylindrical chamber, is provided with lip portions 18 and shoulder portions 19 to receive caps or closure members 17 which fit tightly within the casing walls to form a liquid-tight closure for the chamber.

A pair of oppositely disposed pistons 22 and 23 are positioned for reciprocatory movement within the cylindrical chamber and divide it into three separate chambers, the piston 22 defining what may be termed the compression chamber 24 in one end of the casing and the piston 23 defining a rebound chamber 25 in the opposite end thereof. The pistons being spaced from each other, a liquid reservoir 26 is formed between the adjacent ends thereof. This liquid reservoir communicates through an opening 27 in the top of the inner chamber wall with another reservoir portion 28 formed by the outer casing walls.

The pistons are designed to be reciprocated within the casing to compress the fluid between the closure members 17 and the pistons themselves. For this purpose a rocker lever 29 extends into the cylindrical chamber through the opening 27 and is formed with spherical bearing surfaces 31 to contact the outer bearing faces 32 of the piston heads. An extension of the rocker lever 29 extends outwardly through the casing wall and is secured to an operating arm 33 which may be secured by a second pivoted arm 34 to the vehicle axle.

It will be understood that upon movement of the axle relative to the frame, the suspension springs will be deflected and the arms 33 and 34 will transmit motion to the rocker lever 29 whereby the pistons 22 and 23 will be reciprocated within the chamber to alternately compress the fluid in their respective working chambers 24 and 25. Compression springs 35 are provided between the closure members 17 and the piston heads to yieldingly urge the pistons toward their retracted positions.

The piston heads are formed with ports 36 which connect the interior thereof with the reservoir portion 26 so that fluid may flow from the reservoir to the interior of the piston and vice versa. Flanged ring members 37 are provided interiorly of the pistons and are maintained in position against the head portions thereof by compression springs 35. Flat slush valve members 38 are positioned within the ring members 37 in spaced relation to the ports 36 and are urged to seated position against the piston heads by light compression springs 39 which bear against the underside thereof and against the flanged portions of the ring members 37. These valve members are designed to be opened by the force of the fluid flowing from the reservoir into the working chambers on the retracting stroke of the pistons whereby the working chambers will be quickly filled with fluid. Each of the valve members 38 is provided with a port 41 which establishes constant communication between the working chambers and the fluid reservoir 26 through the ports 36 in the piston heads.

The valve members 38 are also each provided with housings 42 centrally thereof which are open at one end toward the piston head and have a port 43 in the other end thereof communicating with the interior of the piston and the fluid working chamber. The ports 43 are opened and closed by one-way valves 44 which are urged to closed position by small springs 45 but which are designed to open against the spring pressure at a predetermined fluid pressure within the working chambers on the compression stroke of the pistons so that a suitable fluid pressure relief is afforded permitting the pistons to be compressed under yielding fluid pressure opposition.

It will be understood from the above construction that the ports 41 in the valve 38 provide a constant open communication between the working chambers and the reservoir 26 through ports 36 in the piston heads, the port 41 in the compression piston valve being slightly larger than the corresponding port of the valve in the rebound piston 23. It will also be seen that upon the compression movements of the pistons, fluid is permitted to escape from the working chambers through ports 43 and the one-way valves 44 but not vice versa; that is, upon the retracting stroke of the pistons these one-way valves 44 are closed, but fluid may flow from the reservoir to the interior of the pistons and the working chambers by means of the slush valve 38 which opens upon the retracting stroke.

From the foregoing, it will be apparent that as the rocker lever 29 is moved, for instance to the right upon compression of the vehicle springs, the compression piston 22 will be moved to the right to telescope within the compression chamber 24 against the action of the compression spring 35. As the pressure increases due to the compression of the fluid in the chamber 24, the valve 44 will open against the action of the spring 45 thereby allowing a restricted relief for the compressed fluid within the chamber. The fluid will now flow through the port 43 and ports 36 into the fluid reservoir 26. As the rocker lever 29 is moved in the opposite direction, or to the left upon the rebound of the vehicle springs, to compress the piston 23 in the rebound chamber 25, the compression spring 35 in the compression chamber 24 will move the piston 22 toward its retracted position or to the left. As the pressure is relieved within the chamber 24, due to the retraction of the piston, the one-way valve 44 will close and the piston will begin to fill with fluid from the reservoir through the ports 36 and the port 41 in the slush valve 38. The spring 39 which urges the slush valve 38 to its seated position is comparatively light and, as the piston moves to retracted position, the valve will be unseated by the pressure of the fluid flowing from the reservoir, allowing a comparatively large amount of fluid to flow into the interior of the piston and the fluid chamber. By this construction it will be seen that the piston is quickly refilled during its retracting stroke and that a restricted flow of fluid is permitted from the interior of the piston and the fluid chamber to the fluid reservoir 26 upon the compression stroke thereof. The action of the rebound piston 23 and its associated parts is identical with that just described.

It is usually desirable that the compression piston 22 of the shock absorber have less resistance to its movement than the rebound piston 23. To partially accomplish this result, as previously described, the port 41 in the compression piston 22 is slightly larger than the corresponding port in the rebound piston. The present invention provides additional means for accomplishing this result.

As shown in Fig. 6, a longitudinally extending passage-way 40 is formed in the casing at one side of the working chambers and extends in parallel relation thereto. This passage-way is connected to each of the working chambers 24 and 25 by a port 46, which connects one end thereof with the compression chamber 24, and a port 47 which connects the opposite end of the passage-way with the rebound chamber 25. These ports 46 and 47 are metering ports and it will be noted that the port 46 is somewhat larger than the port 47 so that fluid flowing from the compression chamber 24 into the passage-way will have less resistance to its flow than fluid flowing from the rebound chamber 25 through the metering port 47. From the construction just described, it will be apparent that in addition to the valve means provided in the piston heads, fluid relief means are provided whereby fluid may flow from one of the working chambers to the other.

To further provide for restriction of the rebound piston and freedom of the compression piston, a one-way valve 48 is provided in the passage-way which is adapted to open and close the port 46 leading from the passage-way to the compression chamber 24. To provide for easy removability of this valve, a screw threaded plug 49 is fitted into the side of the casing and is provided with a recess 51 adapted to receive the stem of the valve. A light compression spring 52 encircles the valve stem and bears against the removable plug 49 and against the valve head so that this valve is always urged to closed position over the port 46. By reason of this construction, it will appear that upon the compression movement of the compression piston 22 in the chamber 24, the fluid in the chamber will flow to the reservoir through the valve means in the piston head as previously described, and in addition will flow through the metering port 46 to open the valve 48 and will then flow through the passage-way 40 and the metering port 47 into the rebound chamber 25. This action, however, will not be vice versa, that is, upon compression of the rebound piston 23 in the rebound chamber 25, fluid will not be permitted to flow through the passageway 40 and port 46 to the compression chamber 24 because of this one-way valve 48. It will therefore be apparent that means are provided whereby less fluid resistance is offered to the movement of the compression piston than to the movement of the rebound piston. The shock absorber mechanism which has thus far been described is preferably adjusted and set to what may be termed a "firm setting", that is, the valve springs, ports and other parts are arranged and adjusted so that the shock absorber will offer a comparatively large resistance to the compression and rebound movements of the vehicle springs.

In order to provide a "soft ride", it is desirable that means be provided whereby the fluid resistance to the piston movements of the shock absorber is considerably lessened. In accordance with the present invention, this is accomplished by additional by-pass means which communicates at one end with the passage-way 40 in each of the vehicle shock absorbers, and at its other end with each of the reservoir portions 28.

This additional by-pass means comprises a plurality of separate conduits 53 which are respectively connected through each of the shock absorber casings with each of the passage-ways 40 and extend along the frame members 10 and upwardly to a point adjacent the vehicle dash. A single conduit 56 extends from this point and is connected by branch conduits 57 to each of the reservoir portions 28 of the shock absorbers. It will thus be seen that fluid may be by-passed from each of the passage-ways 40 of the shock absorbers to the reservoirs thereof through the conduits 53, 56 and 57.

Suitable valve mechanism for controlling the fluid flow through the by-pass may be secured to the vehicle dash behind the instrument panel 59. As shown, this valve may comprise a cylindrical casing 54 to which are secured each of the conduits 53 communicating with the interior of the casing. The conduit 56 is secured to a side of the casing and also communicates with the interior thereof. A suitable cylindrical valve member 55 is positioned for rotary movement within the casing and is provided with a flat portion 57'. As shown, this flat portion is so formed that when it is turned to the position shown in Fig. 3, communication will be established between the conduits 53 and 56. It will be apparent that the valve may be rotated so that the port leading to the return conduit 56 is either partially or entirely closed.

Suitable manual means may be provided for adjusting the valve member. As shown, this manual adjustment may comprise a rod 58, secured to the valve member and extending through one end of the valve casing and the instrument panel to the exterior thereof, and is provided with a suitable knob 61 whereby the valve may be easily rotated by the vehicle operator. If desirable, suitable indicating means may be provided on the instrument panel 59 so that the operator will know to what extent the shock absorbers have been adjusted.

From this description it will be understood that by manually rotating the valve member 55 either a firm, soft, or intermediate setting of the shock absorbers may be secured.

A fluid cup or reservoir 65 may be suitably mounted on the vehicle dash or other convenient place and may be connected by conduits 66 and 67 to the return conduit 56, thus the system will be at all times automatically maintained completely filled with fluid. This cup or reservoir may be provided with a removable closure member for refilling purposes and by removing the cover, the operator may at any time determine whether or not there is an adequate supply of fluid in the system.

From the foregoing it will be apparent that when the manually adjustable valve 55 is in closed position, the shock absorber will function as previously described, that is, upon the compression movement of the suspension springs, when the compression piston 22 is moved to the right, fluid in the compression chamber 24 will escape through the valve mechanism in the piston head to the reservoir and through port 46 and passage-way 40 to the rebound chamber through the metering port 47. Upon movement of the rebound piston 23 to the left, fluid will only be permitted to escape through the valve mechanism in the valve head because of the one-way valve 48 in the passage-way. It will thus be seen that upon the compression movement of the shock absorber, when the vehicle springs are compressed, there will be less fluid resistance to the piston movements than on the rebound stroke, or when the vehicle springs rebound.

When the manual valve 55 is open, in addition to the fluid escape means above described, fluid will be by-passed, on both the compression and rebound movements of the shock absorber through the by-pass 53, the valve casing 54, and the return conduit 56, from the passage-way 40 to the reservoir portion 28 of each absorber. Thus, all four shock absorbers of the system may be adjusted to either a firm, soft or intermediate setting by simply turning the knob 61 on the vehicle dash. By such adjustment, substantially the full effect of the vehicle springs may be secured when the vehicle is moving slowly over an uneven surface, but at high speeds, or when the vehicle encounters unusually rough roads, the shock absorbers may be adjusted to considerably restrict the vehicle spring movements.

It will be apparent that numerous changes and modifications may be made in the construction disclosed without departing from the spirit of the invention. It is intended, therefore, that the invention is to be limited only by the scope of the appended claims.

What is claimed and desired to be secured by Letters Patent is:

1. In a hydraulic shock absorber, a casing forming a fluid containing chamber, a piston in the chamber defining working chambers, a passage-way formed in the casing and connected at its ends to the working chambers on opposite sides of the piston, actuating means for moving the piston to force fluid from the working chambers into the passage-way, fluid by-pass means associated between the passage-way and the interior of the casing, valve means controlling the fluid flow through the by-pass, and valve means associated with the working chambers and the passage-way whereby fluid may flow from one of said chambers to the other but not vice versa.

2. In a hydraulic shock absorber, a casing forming a fluid containing chamber, a movable piston in the chamber defining working chambers, a passage-way formed in the casing and connecting the working chambers, actuating means for moving the piston to force fluid from the working chambers into the passage-way, and separate fluid by-pass means connecting the passage-way with the interior of the casing.

3. In a hydraulic shock absorber, a casing forming a fluid containing reservoir and a piston chamber, a movable piston in the chamber defining working chambers, a passage-way formed in the casing and connecting the working chambers, actuating means for moving the piston to force fluid from the working chambers into the passage-way, and separate fluid by-pass means connecting the passage-way with the reservoir.

4. In a hydraulic shock absorber, a casing forming a fluid containing chamber, a movable piston in the chamber defining working chambers, a passage-way formed in the casing and connecting the working chambers, actuating means for moving the piston to force fluid from the working chambers into the passage-way, separate fluid by-pass means connecting the passage-way with the interior of the casing, and a manually adjustable valve associated with the by-pass means for controlling the quantity of fluid passing therethrough.

5. In a hydraulic shock absorber, a casing forming a fluid containing reservoir and a piston chamber, a movable piston in the chamber defining working chambers, a passage-way formed in the casing and connecting the working chambers, port means establishing fluid communication between the working chambers and the reservoir, actuating means for moving the piston to force fluid from the working chambers into the passage-way and into the reservoir, and separate fluid by-pass means connecting the passage-way with the reservoir.

6. In a hydraulic shock absorber for motor vehicles, a casing forming a fluid reservoir and a piston chamber, a movable piston in the chamber defining working chambers, a passage-way formed by the casing and connecting the working chambers, fluid responsive one-way valve relief means in the piston adapted to establish fluid communication between the working chambers and the reservoir to permit fluid under compression in the working chambers to move into the reservoir but not vice versa, metering ports between each of the working chambers and the passage-way, a one-way valve between one working chamber and the passage-way controlling one of the ports to permit fluid under compression to flow from the chamber to the passage-way but not vice versa, by-pass means connecting the passage-way with the reservoir, and a manually controllable valve controlling the by-pass and located within easy reach of the vehicle driver; when said by-pass is open, fluid may flow from one of the working chambers through said metering ports and the passage-way to the opposite working chamber and also to the reservoir through the by-pass, and when the by-pass is closed by said manual valve, fluid may flow from one of the working chambers through the passage-way and one of the metering ports to the opposite working chamber but not vice versa.

7. In a hydraulic shock absorber, a casing forming a fluid containing reservoir and a piston chamber, a movable piston in the chamber defining working chambers, a passage-way formed by the casing and connecting the working chambers, port means associated with the piston establishing open fluid communication between the working chambers and the reservoir, actuating means for moving the piston to compress the fluid in the working chambers, one-way valve relief means associated with the piston adapted to establish additional fluid communication between the working chambers and the reservoir to permit fluid under compression in the working chambers to pass into the reservoir but not vice versa, and separate fluid by-pass means connecting the passage-way with the reservoir.

8. In a motor vehicle, a plurality of hydraulic shock absorbers each having a casing forming a fluid reservoir and a piston chamber, a piston in the chamber forming working chambers, a passage-way formed in the casing connecting the working chambers, a valve casing secured to the vehicle adjacent the driver's seat, fluid conduit means connecting the passage-way of each shock absorber with the valve casing, return conduit means leading from the valve casing to the reservoir of each absorber, valve means within the valve casing associated to open and close communication between the two conduit means whereby fluid communication may be established between the by-pass of each absorber and the reservoir thereof, and manual means within easy reach of the vehicle driver for controlling said valve means.

9. In a motor vehicle, a plurality of hydraulic shock absorbers each having a casing forming a fluid reservoir and a piston chamber, a piston in the chamber defining working chambers, a passage-way formed in the casing connecting the working chambers, a valve casing secured to the vehicle adjacent the driver's seat, a plurality of fluid conduits, each directly connecting the passage-way of each absorber with the valve casing, a single return conduit leading from the valve casing, branch conduit means connecting said single return conduit with the reservoir of each absorber, and manually controllable valve means in the valve casing to open and close fluid communication between said conduits.

JOHN M. CHRISTMAN.